United States Patent
Kang et al.

(10) Patent No.: US 12,300,028 B2
(45) Date of Patent: May 13, 2025

(54) METHOD AND APPARATUS WITH IMAGE PROCESSING

(71) Applicant: Samsung Electronics Co., Ltd., Suwon-si (KR)

(72) Inventors: Dongwoo Kang, Seoul (KR); Weiming Li, Beijing (CN); Bao He, Beijing (CN); Qiang Wang, Beijing (CN); Sunghoon Hong, Hwaseong-si (KR); Lin Ma, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 432 days.

(21) Appl. No.: 17/534,831

(22) Filed: Nov. 24, 2021

(65) Prior Publication Data
US 2022/0171959 A1    Jun. 2, 2022

(30) Foreign Application Priority Data

Nov. 27, 2020 (CN) .......................... 202011359407.5
Oct. 1, 2021 (KR) .......................... 10-2021-0130966

(51) Int. Cl.
| | | |
|---|---|---|
| G06T 3/4007 | (2024.01) | |
| G06T 7/70 | (2017.01) | |
| G06V 10/25 | (2022.01) | |
| G06V 10/46 | (2022.01) | |
| G06V 40/16 | (2022.01) | |

(52) U.S. Cl.
CPC .......... *G06V 40/171* (2022.01); *G06T 3/4007* (2013.01); *G06T 7/70* (2017.01); *G06V 10/25* (2022.01); *G06V 10/462* (2022.01)

(58) Field of Classification Search
CPC .... G06V 40/171; G06V 10/25; G06V 10/462; G06V 10/454; G06V 10/82; G06T 3/4007; G06T 7/70
See application file for complete search history.

(56) References Cited

U.S. PATENT DOCUMENTS

| | | | | |
|---|---|---|---|---|
| 7,653,221 B2* | 1/2010 | Gu | ....................... | G06V 40/171 |
| | | | | 382/254 |
| 9,530,073 B2* | 12/2016 | Hamsici | ............... | G06V 10/462 |
| 2008/0065291 A1* | 3/2008 | Breed | .................... | G08B 21/22 |
| | | | | 382/190 |

(Continued)

FOREIGN PATENT DOCUMENTS

| | | |
|---|---|---|
| KR | 10-2019-0100982 A | 8/2019 |
| KR | 10-2019-0116052 A | 10/2019 |

OTHER PUBLICATIONS

Liu, Ming-Yu, et al. "Coupled Generative Adversarial Networks." *Advances in neural information processing systems 30th Conference on Neural Information Processing Systems* 2016 (9 pages in English).

(Continued)

*Primary Examiner* — Ian L Lemieux
*Assistant Examiner* — Devin J Dhooge
(74) *Attorney, Agent, or Firm* — NSIP Law

(57) ABSTRACT

A method with image processing includes: determining a feature map of an image; determining a spatial position weight of pixel points of the feature map; determining a corrected feature map by correcting the feature map based on the spatial position weight of the pixel points; and determining a key point based on the corrected feature map.

22 Claims, 13 Drawing Sheets

(56) References Cited

U.S. PATENT DOCUMENTS

| | | | |
|---|---|---|---|
| 2018/0137647 A1* | 5/2018 | Li | G06T 7/73 |
| 2019/0050632 A1 | 2/2019 | Weng et al. | |
| 2019/0102528 A1 | 4/2019 | Beacham et al. | |
| 2019/0122072 A1 | 4/2019 | Cricri et al. | |
| 2019/0213747 A1* | 7/2019 | Ma | G06T 7/70 |
| 2019/0332850 A1 | 10/2019 | Sharma et al. | |
| 2020/0129063 A1 | 4/2020 | McGrath et al. | |
| 2020/0225673 A1* | 7/2020 | Ebrahimi Afrouzi | G05D 1/0016 |
| 2020/0293796 A1* | 9/2020 | Sajjadi Mohammadabadi | G06V 10/82 |
| 2021/0097715 A1* | 4/2021 | Li | G06T 7/73 |
| 2021/0142032 A1* | 5/2021 | Kim | G06F 18/2413 |

OTHER PUBLICATIONS

Nazeri, Kamyar, et al. "EdgeConnect: Generative Image Inpainting with Adversarial Edge Learning" *arXiv:1901.00212v3* Jan. 11, 2019 (17 pages in English).

Yuan, Xiaowei, et al. "Face De-occlusion using 3D Morphable Model and Generative Adversarial Network." *Proceedings of the IEEE/CVF International Conference on Computer Vision* 2019 pp. 10062-10071.

Alqahtani, Hamed, et al. "Applications of Generative Adversarial Networks (GANs): An Updated Review." *Archives of Computational Methods in Engineering vol. 28 Issue 2* Dec. 19, 2019 (21 pages in English).

\* cited by examiner

METHOD AND APPARATUS WITH IMAGE PROCESSING

CROSS-REFERENCE TO RELATED APPLICATIONS

This application claims the benefit under 35 USC § 119(a) of Chinese Patent Application No. 202011359407.5 filed on Nov. 27, 2020 in the China National Intellectual Property Administration and Korean Patent Application No. 10-2021-0130966 filed on Oct. 1, 2021 in the Korean Intellectual Property Office, the entire disclosures of which are incorporated herein by reference for all purposes.

BACKGROUND

1. Field

The following description relates to a method and apparatus with image processing.

2. Description of Related Art

Computer vision may be a technology that may make a useful determination for objective objects and scenes based on image recognition. Key point detection, a technology also referred to as a technology for detecting feature points or points of interest (POI), may be applied to various tasks such as visual positioning. In visual positioning, positioning and tracking pupils of human eyes may be used in augmented reality (AR). For example, in a head-up display (HUD) device of a vehicle, positioning and tracking of human eyes may need to be performed to determine a position on a windshield at which information is to be displayed. A typical method for image key point detection may be generally based on shape restriction. A model may obtain statistical information on a feature point distribution of a training image sample using the training image sample, and learn an allowable change direction of a feature point to find a position of a corresponding feature point in a target image.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In one general aspect, a method with image processing includes: determining a feature map of an image; determining a spatial position weight of pixel points of the feature map; determining a corrected feature map by correcting the feature map based on the spatial position weight of the pixel points; and determining a key point based on the corrected feature map.

The determining of the spatial position weight may include: detecting an initial position of key points of the image; determining a first weight based on the initial position; determining a second weight based on the feature map; and determining the spatial position weight based on the first weight and the second weight.

The method may include: determining a first interpolation coefficient based on first relative distance information and a first image; and determining the image by performing an interpolation based on the first interpolation coefficient and pixel points of the first image, wherein the first relative distance information is information associated with a relative distance between a projected point on the first image of a pixel point of the image and an adjacent pixel point of the projected point.

The determining of the first interpolation coefficient may include: extracting a feature of the first image; determining a first spliced feature by splicing the feature and the first relative distance information; and determining the first interpolation coefficient by performing a convolution based on the first spliced feature.

The method may include: determining an eye region-free image that does not comprise an eye region by cropping, from a second image, an eye region image block comprising an interference; determining a pupil weight map based on the second image; determining an interference-removed eye region image block in which the interference is removed based on the pupil weight map and the eye region image block; and determining either one or both of the first image and the image by splicing the interference-removed eye region image block and the eye region-free image.

The method may include determining a reliability of the feature map; and determining whether tracking is successful based on the reliability.

The determining of the reliability may include determining the reliability of the feature map by performing a convolution operation, a fully connected operation, and a softmax operation based on the feature map.

The method may include adjusting a three-dimensional (3D) display effect of a display interface based on a position of the key point.

In another general aspect, one or more embodiments include a non-transitory computer-readable storage medium storing instructions that, when executed by a processor, configure the processor to perform any one, any combination, or all operations and methods described herein.

In another general aspect, a method with image processing includes: determining a candidate box of a feature map of an image; determining second relative distance information corresponding to information associated with a relative distance between a projected point on the feature map in the candidate box of a coordinate point of a first feature map of a preset size and an adjacent coordinate point of the projected point; determining a second interpolation coefficient based on the second relative distance information and the feature map in the candidate box; determining the first feature map by performing an interpolation based on the second interpolation coefficient and the feature map in the candidate box; and performing processing based on the first feature map.

The determining of the second interpolation coefficient may include: determining a second spliced feature based on the feature map in the candidate box and the second relative distance information; and determining the second interpolation coefficient by performing a convolution based on the second spliced feature.

In another general aspect, an apparatus with image processing includes: a processor configured to: determine a feature map of an image; determine a spatial position weight of pixel points of the feature map; determine a corrected feature map by correcting the feature map based on the spatial position weight of the pixel points; and determine a key point based on the corrected feature map.

For the determining of the spatial position weight, the processor may be configured to: detect an initial position of key points of the image; determine a first weight based on the initial position; determine a second weight based on the feature map; and determine the spatial position weight based on the first weight and the second weight.

The processor may be configured to: determine a first interpolation coefficient based on first relative distance information and a first image; and determine the image by performing an interpolation based on the first interpolation coefficient and pixel points of the first image, wherein the first relative distance information is information associated with a relative distance between a projected point on the first image of a pixel point of the image and an adjacent pixel point of the projected point;

For the determining of the first interpolation coefficient, the processor may be configured to: extract a feature of the first image; determine a first spliced feature by splicing the feature and the first relative distance information; and determining the first interpolation coefficient by performing a convolution based on the first spliced feature.

The processor may be configured to: determine an eye region-free image that does not comprise an eye region by cropping, from a second image, an eye region image block comprising an interference; determine a pupil weight map based on the second image; determine an interference-removed eye region image block in which the interference is removed based on the pupil weight map and the eye region image block; and determine either one or both of the first image and the image by splicing the interference-removed eye region image block and the eye region-free image.

The processor may be configured to determine a reliability of the feature map; and determine whether tracking is successful based on the reliability.

The processor may be configured to determine the reliability of the feature map by performing a convolution operation, a fully connected operation, and a softmax operation based on the feature map.

The processor may be configured to adjust a three-dimensional (3D) display effect of a display interface based on a position of the key point.

The apparatus may include the display interface configured to display the adjusted 3D display effect.

The apparatus may include a memory storing instructions that, when executed by the processor, configure the processor to perform the determining of the feature map, the determining of the spatial position weight, the determining of the corrected feature map, and the determining of the key point.

In another general aspect, a method with image processing includes: determining a first weight based on an initial position of key points of an image; determining a second weight based on a feature map of the image; determining a spatial position weight of pixel points of the feature map based on the first weight and the second weight; and determining a key point by correcting the feature map based on the spatial position weight.

Other features and aspects will be apparent from the following detailed description, the drawings, and the claims.

Figure 1:
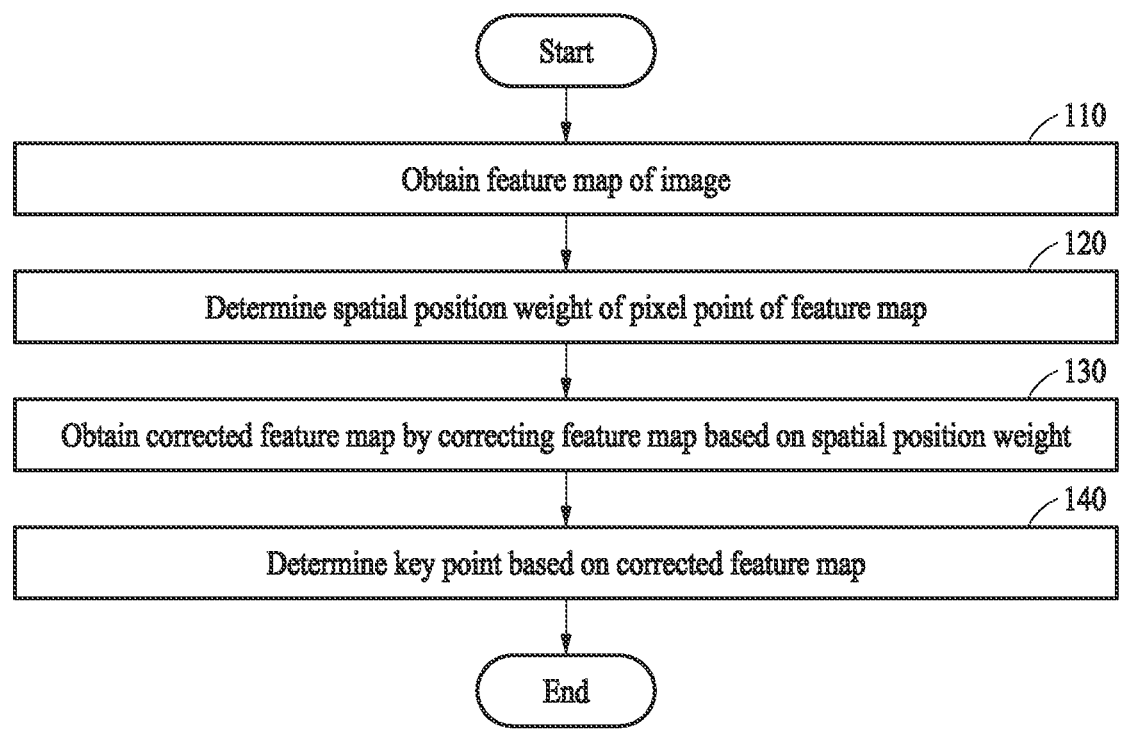
FIG. 1 illustrates an example of an image processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for describing various examples only and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "comprises," "includes," and "has" specify the presence of stated integers, steps, features, numbers, operations, members, elements, and/or combinations thereof, but do not preclude the presence or addition of one or more other integers, steps, features, numbers, operations, members, elements, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Throughout the specification, when an element, such as a layer, region, or substrate, is described as being "on," "connected to," or "coupled to" the other element, it may be directly "on," "connected to," or "coupled to" the other component, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments. Hereinafter, examples will be described in detail with reference to the accompanying drawings, and like reference numerals in the drawings refer to like elements throughout.

Pupil positioning and tracking may be used to implement augmented reality (AR). For example, in a head-up display (HUD) device of a vehicle, a position on a windshield at which information is to be displayed may be determined through positioning and tracking performed on pupils of eyes of a driver. For another example, in a portable device having a three-dimensional (3D) display, a position in the device at which 3D information such as a 3D icon and a 3D video is to be displayed may be determined based on 3D positions of pupils.

When an interference (or an interfering object) such as an occlusion exists in an image during pupil positioning, data with the occlusion may be used in the pupil positioning. In such a case, a model may directly estimate a situation with the occlusion of facial key points, and simultaneously estimate a position and a reliability of each key point. A face may be divided into different regions, and each region may correspond to an edge. Information of an occluded edge may be inferred using a space between edges and a relationship between features.

However, numerous datasets may not include such an indication, and thus occlusion labeling information may not be used based on different datasets. Occlusion conditions of different regions may need to be inferred using an iterative method in a typical training process, and thus a computational efficiency may be reduced.

For example, when an image includes an interference (e.g., an occlusion such as eyeglasses), the interference may be removed from the image first. In this example, an operation of removing the eyeglasses and an operation of adding the eyeglasses may be processed concurrently. An eye region and a face region may be separately encoded. Two codes (or datas) including a code (or data) of a face of a person with eyeglasses on and a code (or data) of an eye region of a person without eyeglasses may be combined, and a face image without eyeglasses may thereby be obtained through a network.

Image synthesis using a face and an eye region of another person may have an issue as to whether a new image (e.g., determined through the combination) is realistic, and may not ensure whether a spatial shape of the eye region is greatly changed. Accordingly, a position of a pupil may be changed.

Hereinafter, example embodiments will be described in detail with reference to the accompanying drawings. When describing the example embodiments with reference to the accompanying drawings, like reference numerals refer to like elements and a repeated description related thereto will be omitted.

FIG. 1 illustrates an example of an image processing method.

As illustrated in FIG. 1, in operation 110 of an image processing method, a feature map of an image may be obtained. The image may be an image of a human face. The image may be obtained from a video to be detected, and the feature map may be extracted from the image using a feature extraction network.

In operation 120 of the image processing method, a spatial position weight of pixel points of the feature map may be determined. The spatial position weight may be used to correct the pixel points of the feature map. The spatial position weight may be determined based on an initial position of key points of the image and the feature map. The initial position of the key points of the image may be coarsely determined. A first weight may be determined by adjusting the initial position, and a second weight may be determined based on the feature map. The spatial position weight may be determined based on the first weight and the second weight.

In this case, image feature extraction may be first performed and classification may then be performed to determine the initial position of the key points. The initial position of the key points may include a plurality of vectors respectively corresponding to the key points. Each vector may represent a distribution probability of a key point at each position on the image. In an example, the spatial position weight may be derived through a point-wise multiplication of the first weight and the second weight.

A non-limiting example operation of determining a spatial position weight will be described in further detail later.

In operation 130 of the image processing method, a corrected feature map may be obtained by correcting the feature map based on the spatial position weight of the pixel points. In operation 140 of the image processing method, a key point may be determined based on the corrected feature map. The key point may include key points corresponding to facial features and a facial shape, in addition to key points of pupils of eyes. A position of the key point may be determined by inputting the corrected feature map to a classification network.

A non-limiting example operation of determining a key point position will be described in further detail later.

Figure 2:
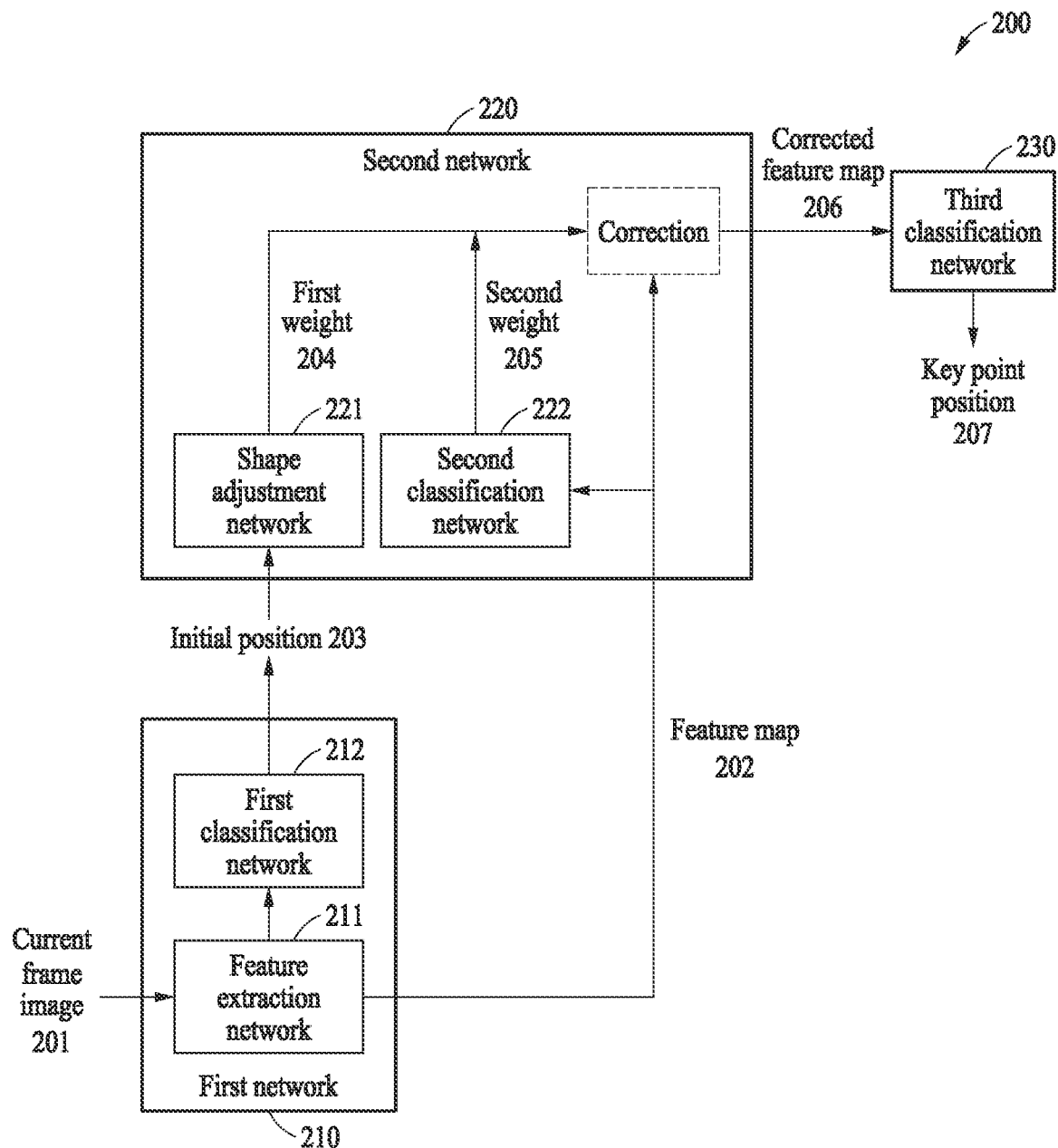
FIG. 2 illustrates an example of an image detecting operation of a pupil positioning model.

For example, an image may be a facial image, and a key point position may include a key point position corresponding to a pupil. FIG. 2 illustrates an example of an image detecting operation of a pupil positioning model 200. A key point position may be determined through the following process of the pupil positioning model 200.

1) A current frame image 201 may be input to a feature extraction network 211 of a first network 210. A resolution of the image 201 may be h*w. The feature extraction network 211 may be MobileNet v2, for example. MobileNet v2 may be a lightweight neural network based on a residual structure.

2) A feature output from the feature extraction network 211 may be input to a first classification network 212 of the first network 210. For example, the first classification network 212 may include one or more fully connected layers, and may obtain an initial position 203 of key points. The initial position 203 may be represented as $a_k$, in which k may be 1, 2, . . . , K (k=1, 2, . . . , K, and K denotes the number of key points). In addition, any one layer of the feature extraction network 211 may output a feature map 202. The feature map 202 may be represented as F.

3) The initial position 203 of key points may be input to a shape adjustment network 221 of a second network 220, and a first weight 204 may thereby be obtained. The first weight 204 may be represented as $w_{struc}$. The size of $w_{struc}$ may be h*w*1. The shape adjustment network 221 may include one or more fully connected layers.

4) The feature map 202 may be input to a second classification network 222 of the second network 220, and a second weight 205 may thereby be obtained. The second weight 205 may be represented as $w_{appear}$. The second classification network 222 may include one or more convolutional layers. The size of $w_{appear}$ may be h*w*1.

5) A spatial position weight may be determined based on $w_{struc}$ and $w_{appear}$. The spatial position weight may be determined by $w=w_{struc} \otimes w_{appear}$, in which w denotes the spatial position weight and $\otimes$ denotes a pointwise multiplication.

6) A corrected feature map 206 may be generated through a correction operation based on the spatial position weight w and the feature map 202. The corrected feature map 206 may be represented as F' and may be generated by $F'=F \otimes W$.

7) The corrected feature map 206 may be input to a third classification network 230. The third classification network 230 may include one or more fully connected layers. A key point position 207 may be obtained through the third classification network 230.

As described above, the corrected feature map 206 may be obtained by determining the spatial position weight of pixel points from the feature map 202 of the image 201 and correcting the feature map 202 based on the spatial position weight of pixel points, and the key point position 207 may be detected from the corrected feature map 206. Thus, one or more embodiments may improve the accuracy in detecting a key point position. Here, a predicted key point may be obtained using a classification network or a regression network based on the feature map 202.

Hereinafter, an example of a structure of the pupil positioning model 200 will be described.

The pupil positioning model 200 may be divided into two portions as illustrated in FIG. 2. The first network 210 may include the feature extraction network 211 and the first classification network 212. The feature map 202 and the initial position 203 of key points may be obtained by inputting the current frame image 201 to the first network 210. The second network 220 may include the shape adjustment network 221 and the second classification network 222. The first weight 204 may be obtained by inputting the initial position 203 of key points to the shape adjustment network 221, and the second weight 205 may be obtained by inputting the feature map 202 to the second classification network 222. The spatial position weight may be determined based on the first weight 204 and the second weight 205. The corrected feature map 206 may be determined based on the spatial position weight and the feature map 202. The key point position 207 may be obtained based on the corrected feature map 206.

Hereinafter, an example of training a pupil positioning model will be described.

Figure 3:
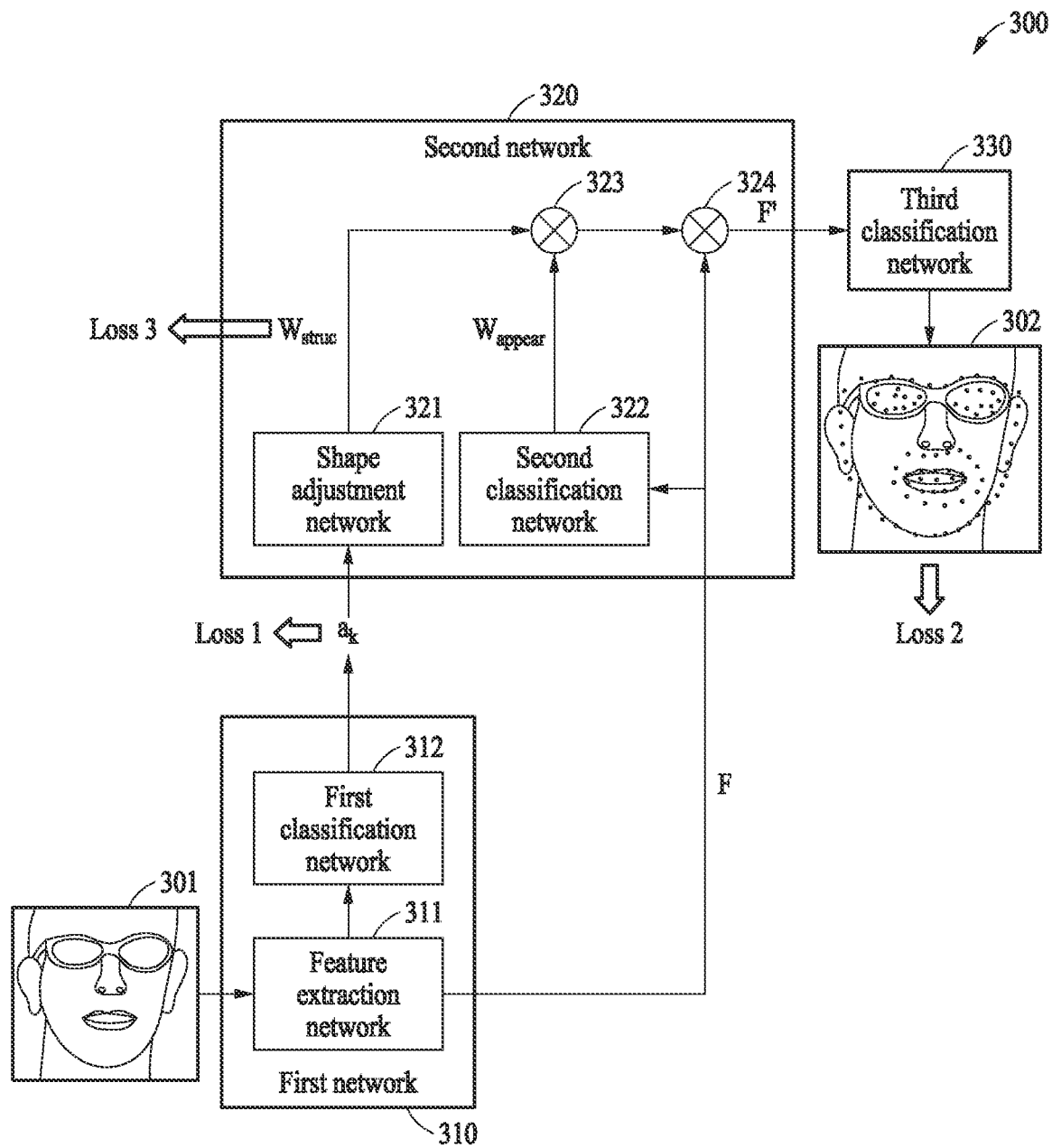
FIG. 3 illustrates an example of training a pupil positioning model.

A pupil positioning model 300 may be trained using three loss functions as illustrated in FIG. 3.

A first loss function Loss 1 may represent a loss based on a difference between an initial key point position $a_k$ and an actual key point position. The actual key point position may also be referred to herein as a ground truth key point position. A second loss function Loss 2 may represent a loss based on a difference between a key point position and the ground truth key point position. The second loss Loss 2 may be defined identically to or differently from the first loss function Loss 1. The first loss function Loss 1 and the second loss Loss 2 may be loss functions of various types such as smooth L1 and L2.

To obtain a greater weight for accurate point prediction, a third loss Loss 3 may be defined as Equation 1 below, for example.

$$L_3 = \|e - w_{struc}\| \qquad \text{Equation 1}$$

In Equation 1, $L_3$ denotes a third loss function Loss 3, and $w_{struc}$ denotes a first weight. A non-limiting example of e will be further described later. An initial key point position $a_k$ may be predicted by a feature extraction network 311 and a first classification network 312 of a first network 310 of the pupil positioning model 300. When $\tilde{a}_k$ is a ground truth key point position, $$c_k = \exp(-\beta \|\tilde{a}_k - a_k\|_2^2)$$

may be calculated. k may be 1, 2, . . . , K (k=1, 2, . . . , K), in which K denotes the number of key points. A map of h*w*1 may be initialized to be 0, and each $c_k$ value may be projected into the map. This projection may be performed based on a predicted key point position on a feature map F, or on a position at which two values are the same. When a new projection value is greater than a previous value, the original value may be replaced with the new value, otherwise an existing state may be maintained. The value obtained as such may correspond to e.

A second network 320 of the pupil positioning model 300 may include a shape adjustment network 321 and a second classification network 322, and be used to recalculate a spatial position weight w of key points. The spatial position weight w may be determined through an operation 323 between a first weight $w_{struc}$ and a second weight $w_{appear}$.

Such an iterative calculation may be equivalent to repeating the second network 320 of the pupil positioning model 300 once or plural times. When a corrected feature map F' is determined through an operation 324 between the spatial position weight w and the feature map F, a third classification network 330 may extract a key point position 302 from the corrected feature map F'. Operations 323 and 324 may each correspond to a pointwise multiplication.

Examples of the process of detecting a key point position, and the structure and the training of the pupil positioning model 300 have been described above. Hereinafter, an example of a process of obtaining an image through an interpolation will be described.

Figure 4:
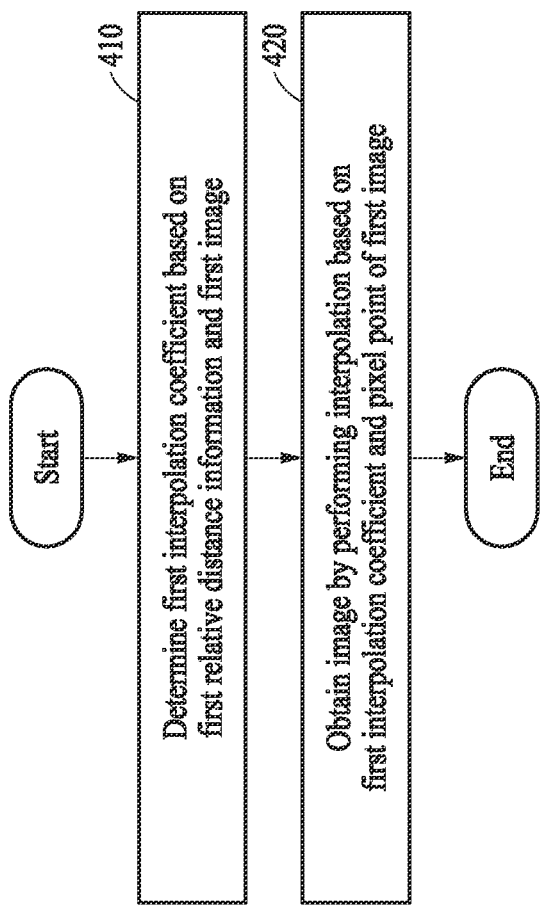
FIG. 4 illustrates an example of interpolation-based image acquisition.

According to example embodiments, operations to be described hereinafter with reference to FIG. 4 may be further performed before a feature map of an image is obtained in operation 110 described above with reference to FIG. 1.

In operation 410, a first interpolation coefficient may be determined based on first relative distance information and a first image. The first relative distance information may be information associated with a relative distance between a projected point on the first image of a pixel point of an image and an adjacent pixel point of the projected point.

The first image may have a resolution of H*W, and the image may have a resolution of h*w through resolution reduction. Here, H, W, h, and w may be natural numbers.

In an example, operation 410 may include the following steps:

1) For any one pixel point of the image, determining a projected point of the pixel point on the first image.

The step of determining the projected point of the pixel point on the first image may include the following steps:
(a) Determining an initial resolution of the first image, and obtaining a target resolution of the image; and
(b) Based on the target resolution and the initial resolution, projecting the pixel point of the image onto the first image and obtaining the projected point of the pixel point on the first image.

The first image may have the resolution of H*W, and the image may have the resolution of h*w through resolution reduction. Coordinates of the projected point may be determined based on Equation 2 below, for example.

$$\tilde{x} = W(x' + 0.5)/w - 0.5$$
$$\tilde{y} = H(y' + 0.5)/h - 0.5$$
Equation 2

In Equation 2, $(\tilde{x}, \tilde{y})$ denotes coordinates of a projected point, and (x', y') denotes coordinates of a pixel point P' on the first image. H*W may represent a resolution of the first image, and h*w may represent a resolution of the image.

Figure 5:
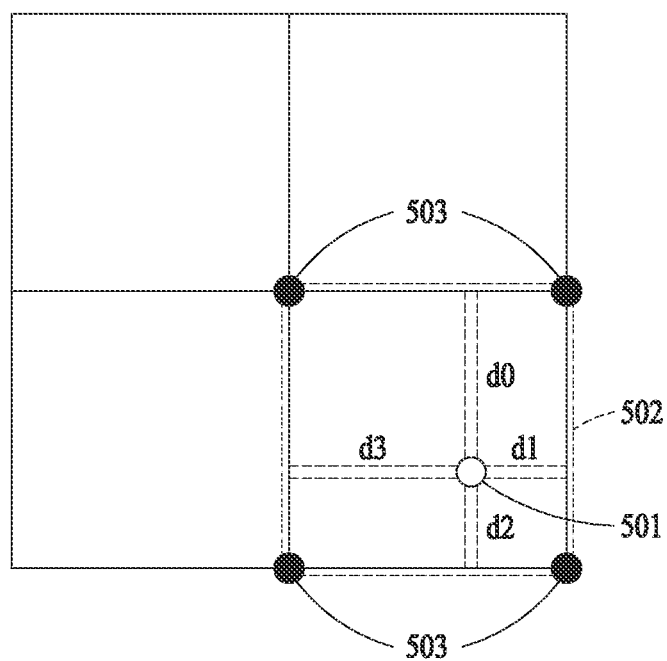
FIG. 5 illustrates an example of determining relative distance information.

2) Obtaining an adjacent pixel point of the projected point on the first image, and determining first relative distance information between the adjacent pixel point and the projected point For example, as illustrated in FIG. 5, a projected point 501 may be disposed in a rectangular grid cell 502 formed by four adjacent pixel points 503 of the projected point 501. First relative distance information may be determined by relative distances d0, d1, d2, and d3 between the projected point 501 and four edges of the grid cell 502.

3) Determining a first interpolation coefficient based on the first relative distance information and the first image For example, similar to a bilinear interpolation, a pixel point on the image may be projected onto the first image, and the first interpolation coefficient may be obtained based on adjacent pixel points on the first image.

Operation 410 of determining the first interpolation coefficient based on the first relative distance information and the first image may include the following steps:
(a) Extracting a feature of the first image;
(b) Obtaining a first spliced feature by splicing the feature and the relative distance information; and
(c) Obtaining the first interpolation coefficient by performing a convolution based on the first spliced feature.

In operation 420, the image may be obtained by performing an interpolation based on the first interpolation coefficient and a pixel point of the first image.

For example, similar to the bilinear interpolation, a value of a pixel point on the image may be obtained by projecting the pixel point of the image onto the first image and performing an interpolation based on adjacent pixel points on the first image, and the image may thereby be generated.

Figure 6:
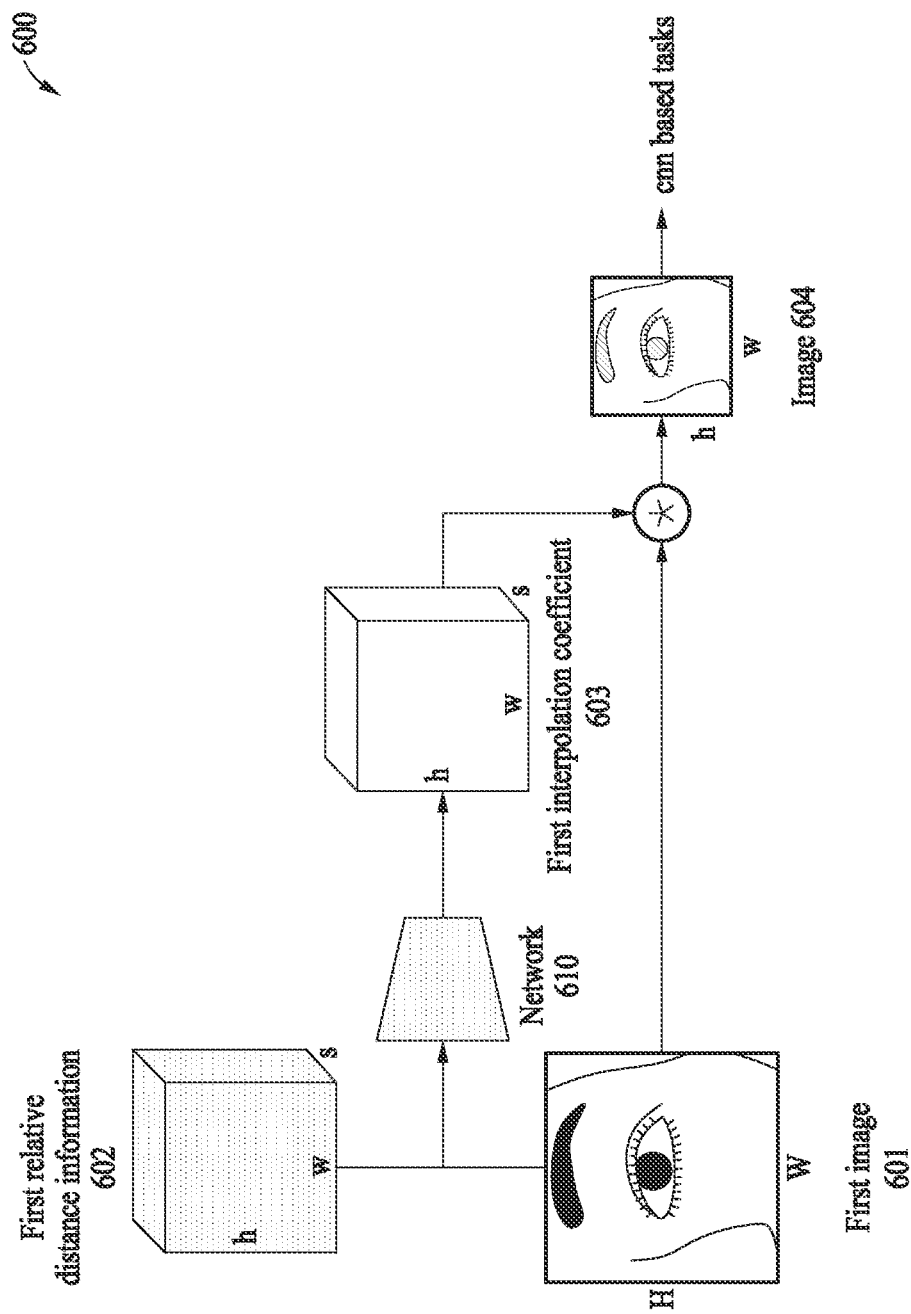
FIG. 6 illustrates an example of a downsampling process.

A process of obtaining an image based on a first image as illustrated in FIG. 6 may be referred to as a downsampling process. The downsampling process may be implemented based on a downsampling network 600. When a first image 601 having a resolution of H*W is given, it may be reduced to an image 604 having a resolution of h*w. Such a process may be similar to a bilinear interpolation. A value of a pixel point of the image 604 may be obtained by projecting the pixel point of the image 604 onto the first image 601 and performing an interpolation using an adjacent pixel point on the first image 601. A first interpolation coefficient 603 may be obtained through a network 610. The network 610 may correspond to a convolutional network. The network 610 may have two inputs—one may be a pixel value of each pixel point in the first image 601 and the other may be first relative distance information 602. After a convolution, the first image 601 may be spliced with the first relative distance information 602, and then the first interpolation coefficient 603 may be obtained through a convolution.

The interpolation may be performed according to Equation 3 below, for example.

$$I' = I \odot \alpha$$
Equation 3

In Equation 3, I' denotes the image 604, and I denotes the first image 601. $\alpha_i$ denotes the first interpolation coefficient 603 of an ith pixel point. Here, $\alpha_i \geq 0$, and $\Sigma_i \alpha_i = 1$. Respective first interpolation coefficients 603 of pixel points may all be greater than or equal to 0, and a sum of the first interpolation coefficients 603 may be 1. By performing the interpolation based on a pixel point of the first image 601 and the first interpolation coefficient 603, a corresponding pixel point on the image 604 may be obtained.

Figure 7:
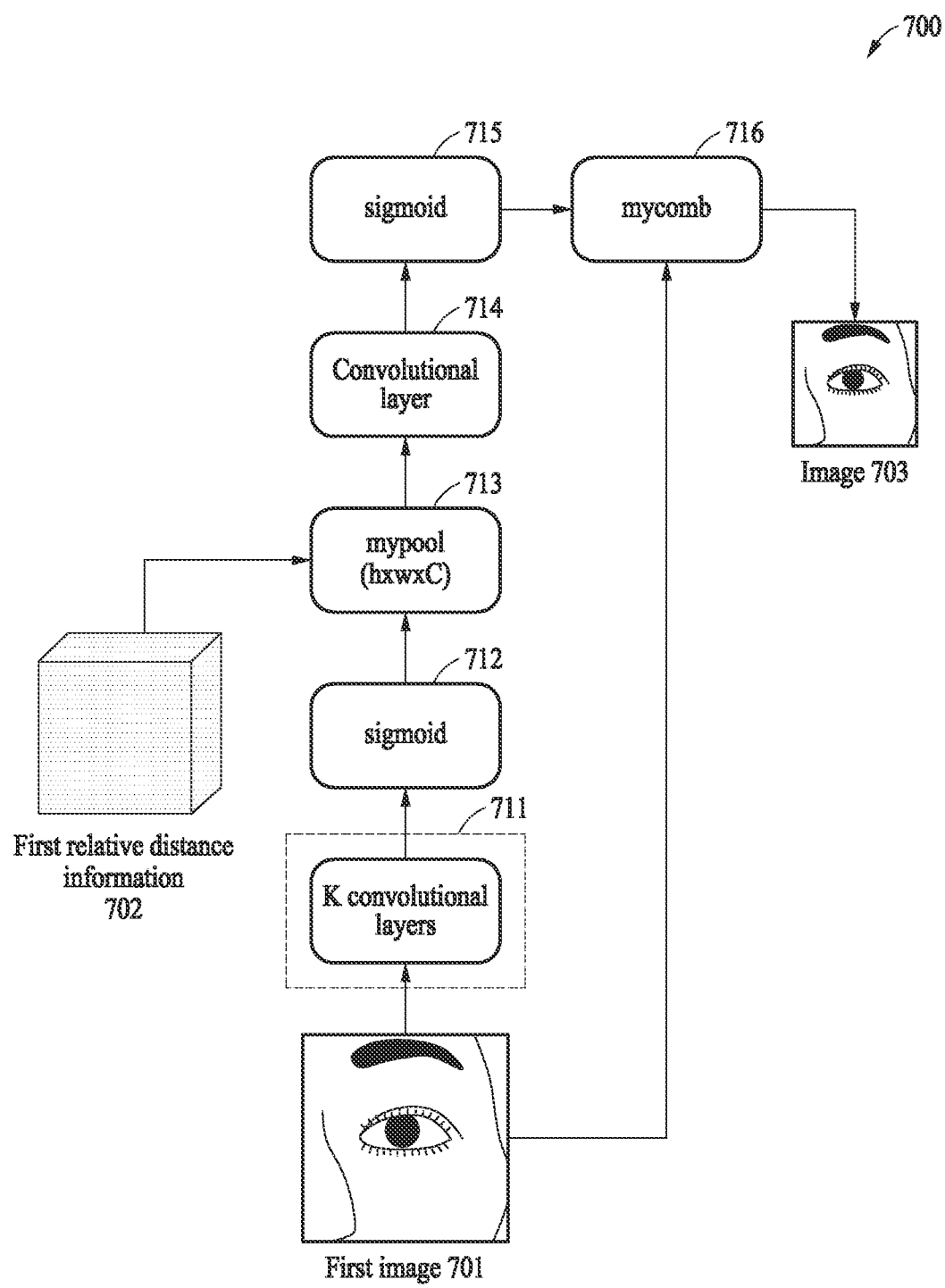
FIG. 7 illustrates an example of a structure of a downsampling network.

Hereinafter, an example of the foregoing process will be further described. As illustrated in FIG. 7, a downsampling network 700 may include K convolutional layers 711, a sigmoid layer 712, a mypool layer (or a splicing layer) 713, a convolutional layer (e.g., one or more convolutional layers) 714, a sigmoid layer 715, and a mycomb layer (or a fusion layer) 716. The mypool layer 713 may generate a feature map having a size of h*w by splicing outputs of the K convolutional layers 711 for a first image 701 and first relative distance information 702, and the convolutional layer 714 may generate a data block having a size of h*w*4 through a convolution operation based on the generated feature map. The data block may represent a first interpolation coefficient based on four adjacent pixel points. The mycomb layer 716 may obtain a final pixel value of an image 703 by performing weighted summation based on the four first interpolation coefficients and corresponding four adjacent pixel values.

Here, first interpolation coefficients of respective channels of the first image 701 may be separately inferred in different ways without being distinguished for each of the first interpolation coefficients of the channels of the first image 701. In addition, feature maps of a plurality of receptive fields may be obtained by performing a plurality of branch convolutions on the first image 701, and a first interpolation coefficient may be obtained by combining these feature maps.

In the foregoing example, the downsampling network 700 may perform splicing based on the first relative distance information 702 and the feature map to generate the first interpolation coefficient. In another example, the downsampling network 700 may preform various transformations (e.g., calculation of a square, etc.) on the first relative distance information 702 and calculate the first interpolation coefficient based on the transformed first relative distance information and the feature map. A method of combining a feature and first relative distance information may not be limited to the splicing in the mypool layer 713. For example, the splicing may be performed in another layer, or other methods may be used for combining instead of the splicing.

In the foregoing example, for processing the first image 701, image feature information of the first image 701 and the first relative distance information 702 of a projected point may be combined as an input. In this case, the influence of a position of the projected point may be better reflected in the input, and the image 703 obtained through this may have a target resolution. In addition, an image feature of the first image 701 may be maintained.

An example of the process of obtaining an image through an interpolation has been described above. Hereinafter, an example of a process of obtaining a first image by removing an interference in an eye region will be described.

In an example, before a first interpolation coefficient is determined based on first relative distance information and a first image in operation 410, the following steps may be further performed:

1) Obtaining an eye region-free image that does not include an eye region by cropping, from a second image, an eye region image block (including an interference);
2) Determining a pupil weight map based on the second image;
3) Obtaining an interference-removed eye region image block in which the interference is removed based on the pupil weight map and the eye region image block; and
4) Obtaining a first image or an image by splicing the interference-removed eye region image block and the eye region-free image.

In the foregoing example, when the first image is obtained by removing the interference from the second image, the image may be obtained from the first image. Alternatively, the image may be obtained directly by removing the interference from the second image.

The interference described herein may be an interfering element that is not eyes disposed in an eye region. The interference in the eye region may include eyeglasses, for example.

Figure 8:
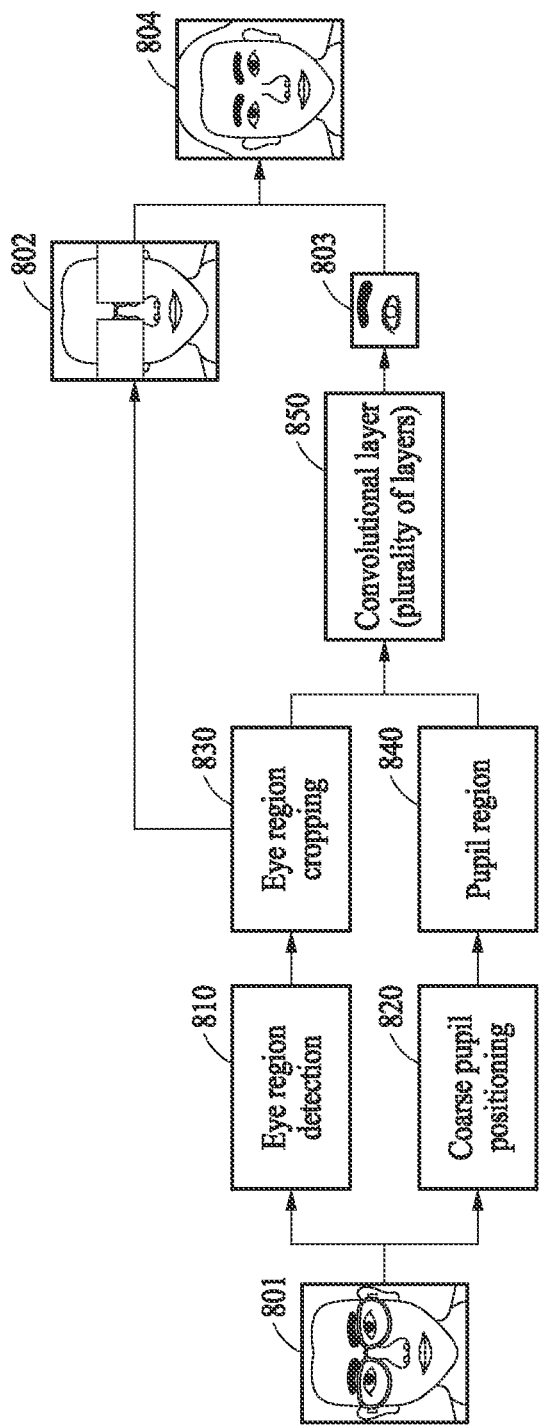
FIG. 8 illustrates an example of an interference removing operation.

For example, when an interference in an eye region of an original image 801 is eyeglasses as illustrated in FIG. 8, the interference may be removed using an interference removal model. In this example, the original image 801 may be referred to as a second image. In operation 810, the interference removal model may detect the eye region in the original image 801 and determine an eye region image block including the interference. In operation 830, the interference removal model may obtain an eye region-free image 802 that does not include the eye region by cropping, from the original image 801, the eye region image block including the interference.

In operation 820, the interference removal model may determine a pupil region by coarsely positioning a pupil in the original image 801. The obtained pupil region may not be as accurate as a pupil position that is based on a key point position, and an approximate position of the pupil may be specified. The interference removal model may execute one or more convolutional layers based on the eye region image block and the pupil region to generate a pupil weight map 803 in which a high weight is assigned to the pupil region in the eye region. For example, the pupil weight map 803 may be based on a Gaussian distribution function having a maximum value around a center of the pupil. The interference removal model may obtain an interference-removed image 804 based on the pupil weight map 803 and the eye region-free image 802.

Hereinafter, an example of training an interference removal model will be described.

Figure 9:
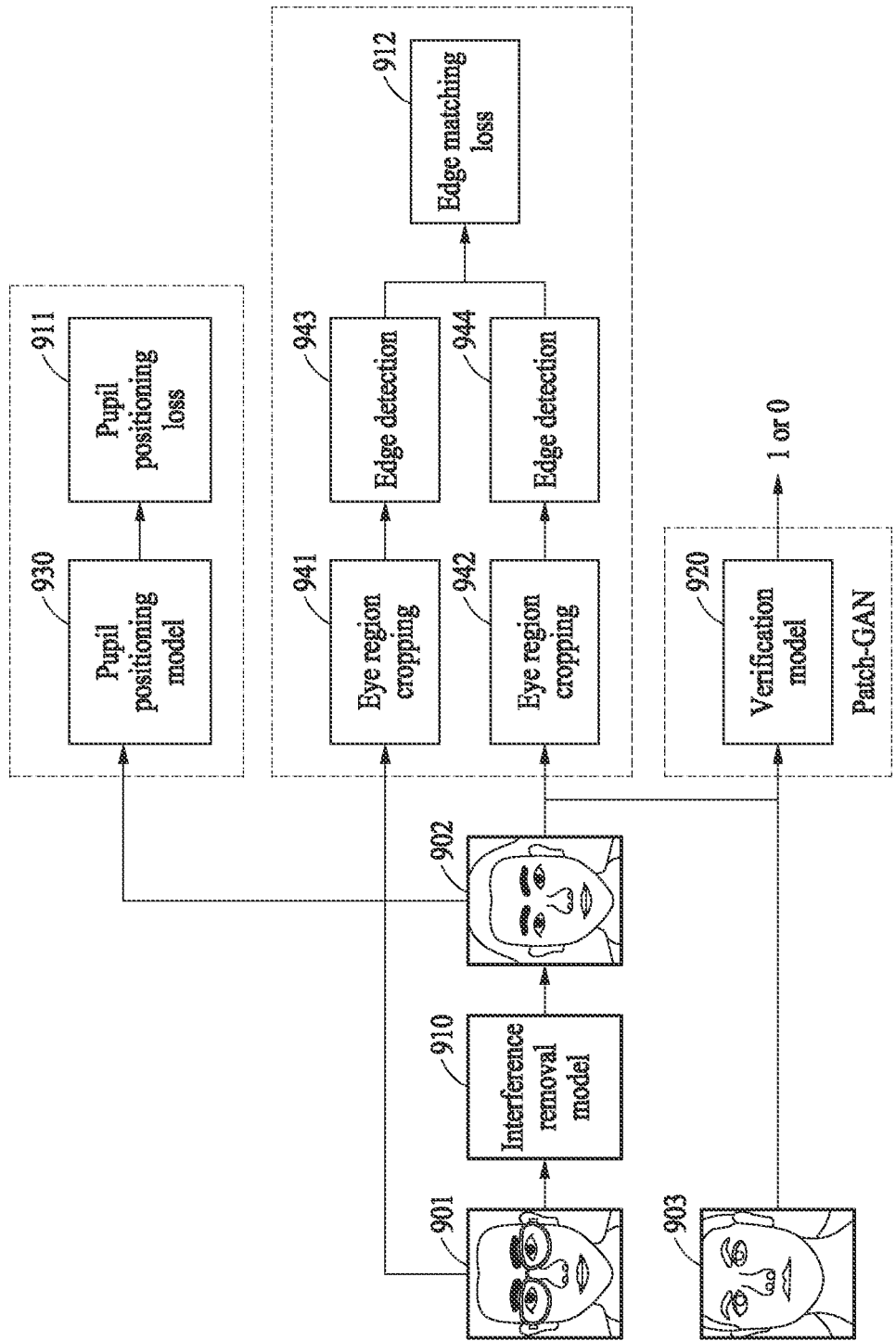
FIG. 9 illustrates an example of training an interference removal model.

As illustrated in FIG. 9, an interference removal model 910 may be trained through a verification model 920. The verification model 920 may determine whether an image 902 generated by the interference removal model 910 corresponds to a naked face. A loss of a loss function may include a loss of the interference removal model 910 and a loss of the verification model 920. For the interferer removal model 910, a pupil positioning loss 911 and an edge matching loss 912 may be used. The pupil positioning loss 911 of a pupil positioning model 930 occurring as the image 902 is provided to the pupil positioning model 930 may be used as the loss of the interference removal model 910. The pupil positioning loss 911 may also be obtained by performing other pupil positioning methods instead of using the pupil positioning model 930.

When an interference is removed from an original image 901 by the interference removal model 910 and the image 902, which is a resulting image corresponding to a result of the removing, is generated, eye regions may be detected through eye detection operations 941 and 942 performed respectively on the original image 901 and the image 902, and two edge images may be generated through edge detection operations 943 and 944 performed respectively on the detected eye regions. In this case, Gaussian smoothing may be applied to the edge detection results. A loss (e.g., L1 loss and/or L2 loss) based on the two edge images may be calculated, and the calculated loss may be considered the edge matching loss 912. The loss may be used for gradient backpropagation. When calculating the edge matching loss 912, only an edge of the image 902 may be used to remove the influence of noise.

The loss of the verification model 920 may represent a difference between the resulting image 902 and a ground truth naked face image 903. The loss of the verification model 920 may be defined through a cross entropy loss. For example, a patch-generative adversarial network (patchGAN) may be used. The edge matching loss 912 may reflect therein a loss of an eye region, and the loss of the verification model 920 may reflect therein a loss of an entire image region (e.g., the image 902).

In the foregoing example, by adopting an edge matching method, positions of eyes and pupils may be well maintained without changes, and key point positions of the pupils may be calculated more accurately.

An example of the process of obtaining a first image by removing an eye interference has been described above. Hereinafter, an example of a process of determining a reliability when a feature map and a detected key point position are determined based on a face region will be described.

In an example, when a feature map of an image is obtained in operation 110 described above with reference to FIG. 1, the following steps may be performed:
1) When a reference face region is obtained from a previous frame image of a video to be detected, determining a face region of an image based on the reference face region;
2) When the reference face region of the previous frame image of the video is not obtained, detecting the face region of the image; and
3) Extracting a feature map from the face region.

In this example, a tracking failure detection model may be used. For a previous frame image of a video to be detected, a reliability of a corrected feature map of the previous frame image may be determined. When the reliability is greater than a preset threshold value, key point detection may be successful with the previous frame image, and a face region of the previous frame image may be considered a face region of an image.

That is, when key point detection is successful with the previous frame image, the face region of the image may be determined based on the face region of the previous frame image. However, when key point detection is unsuccessful with the previous frame image, face region detection may be performed again on a current frame.

In an example, the following steps may be further performed:
1) Determining a reliability of a corrected feature map; and
2) Determining whether target tracking is successful based on the reliability When the reliability is greater than a preset threshold value, target tracking may be successful, and a face region of an image may be set to be a reference face region of a subsequent frame image of a video to be detected.

The step of determining a reliability of a feature map may include performing a convolution operation, a fully connected operation, and a softmax operation on the feature map, and obtaining the reliability of the feature map.

For example, a two-dimensional (2D) vector may be generated by performing a convolution on an obtained feature map of an image and performing a fully connected operation and a softmax operation on a result of the convolution. One element of the 2D vector may be a tracking failure probability, and the other element of the 2D vector may be a tracking success probability. The reliability of the feature map may be set based on the 2D vector. When the reliability is less than or equal to a preset threshold value, tracking, that is, key point detection, may be considered unsuccessful. In contrast, when the reliability is greater than the preset threshold value, tracking, that is, key point detection, may be considered successful.

When tracking using a previous frame image is successful, a rectangular bounding box of a key point of a facial image detected in the previous frame image may be calculated, and a maximum value between a width and a height may be obtained. A center point may then be fixed to obtain a square. A length of a side of the square may be s times the maximum value, in which s may be an integer. The square may be used as a value of a face box of a new frame, that is, a value of a face box of an image. In contrast, when tracking using the previous frame is unsuccessful, a face box may be detected by executing a face detection module again on a current frame.

The process of determining a reliability may be performed using a tracking failure detection model. The tracking failure detection model may include one or more convolutional layers, one or more fully connected layers, and a softmax layer. By inputting the feature map of the image to the tracking failure detection network, whether key point detection succeeds or fails may be determined.

Hereinafter, an example of training a tracking failure detection model will be described.

Figure 10:
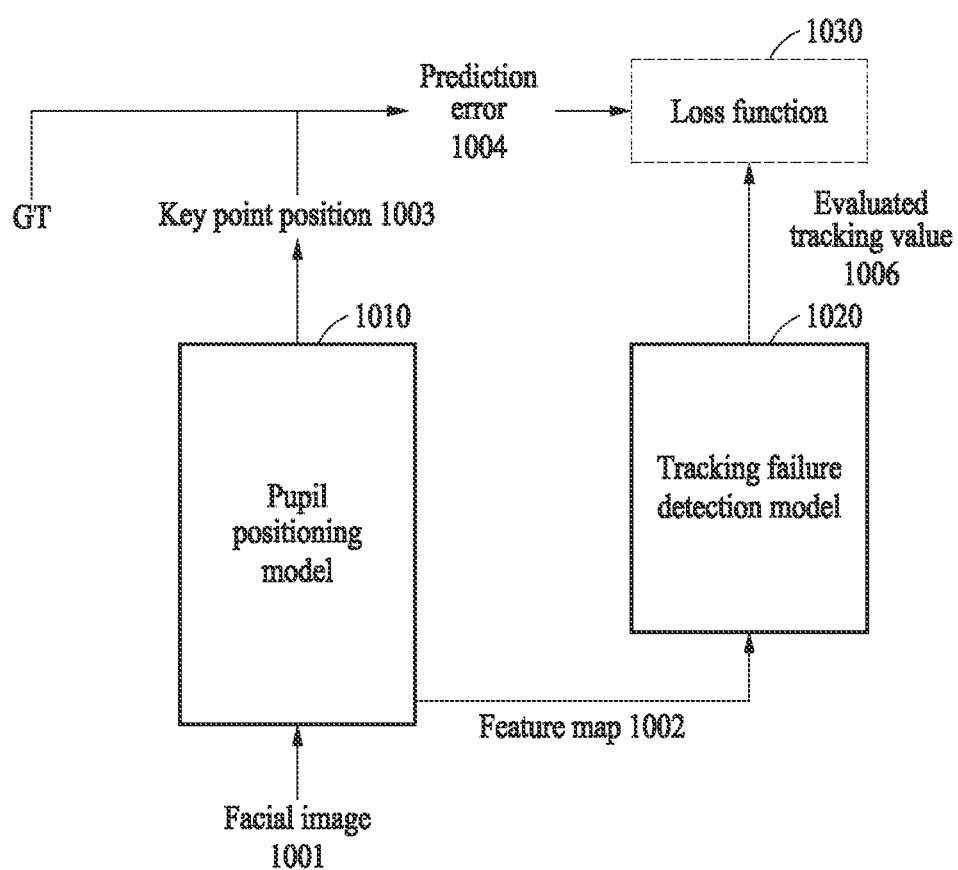
FIG. 10 illustrates an example of training a tracking failure detection model.

As illustrated in FIG. 10, a tracking failure detection model 1020 may be trained in conjunction with a trained pupil positioning model 1010. In this training process, only parameters of the tracking failure detection model 1020 may be adjusted. The pupil positioning model 1010 may be trained in advance, and parameters of the pupil positioning model 1010 may be set during this training process.

The pupil positioning model 1010 may predict a key point position 1003 from a facial image 1001. When a feature map 1002 (e.g., F or F') is generated through a convolution operation in this prediction process of the pupil positioning model 1010, the feature map 1002 may be provided to the tracking failure detection model 1020. The tracking failure detection model 1020 may include one or more convolutional layers, one or more fully connected layers, and a softmax layer, and generate an evaluated tracking value 1006 through a convolution operation, a fully connected operation, and a softmax operation. The evaluated tracking value 1006 may indicate a reliability of the key point position 1003. For example, the evaluated tracking value 1006 may have a value of 0 or 1, in which 0 may represent a tracking failure and 1 may represent a tracking success. The tracking failure may be defined based on a distance between the key point position 1003 predicted by the pupil positioning model 1010 and a ground truth key point position (indicated as GT in FIG. 10).

The reliability may be defined based on the predicted key point position 1003 and the ground truth key point position. For example, when a predicted key point position is a', a ground truth key point position is ã, and a reliability is $c = \exp(-\|a' - \tilde{a}\|)$ in which p is a threshold value of (0, 1), the evaluated tracking value 1006 of the tracking failure detection model 1020 may be defined as Equation 4 below, for example.

$$\tilde{c} = \begin{cases} \begin{bmatrix} 0 \\ 1 \end{bmatrix}, c > p \\ \begin{bmatrix} 1 \\ 0 \end{bmatrix}, \text{else} \end{cases} \quad \text{Equation 4}$$

In Equation 4, $\tilde{C}$ denotes the evaluated tracking value 1006 and may be a 2D vector. One value may indicate a tracking failure probability, and the other value may indicate a tracking success probability. A loss function 1030 of the determination of tracking may be defined using cross entropy. The key point position 1003 may be obtained by inputting the facial image 1001 of an arbitrary frame to the pupil positioning model 1010. A prediction error 1004 may be determined based on the key point position 1003 and the ground truth key point position, and the evaluated tracking value 1006 may be determined based on the tracking failure detection model 1020. Subsequently, parameters of the tracking failure detection model 1020 may be adjusted by determining the loss function 1030 based on the evaluated tracking value 1006 and the prediction error 1004.

In the foregoing example, a reliability of a corrected feature map F' of the image may be determined. When the reliability is less than or equal to a preset threshold value, it may be considered a tracking failure, that is, a failure in key point detection. In contrast, when the reliability is greater than the preset threshold value, it may be considered a tracking success, that is, a success in key point detection. Through this, one or more embodiments may improve the accuracy in key point detection. In addition, when key point detection is successful, a face region of the image may be used as a reference face region of a subsequent frame image to be detected, and thus one or more embodiments may improve the time to be used for processing the subsequent frame image and improve calculation efficiency.

Hereinafter, an example of a scenario of applying the image processing method described herein will be described.

In an example, when a key point position of a pupil is obtained, an operation of adjusting a 3D display effect of a display interface may be further performed based on the key point position.

For example, the image processing method may be applied to a portable device having a 3D display. In this example, a key point position corresponding to a pupil, that is, a 3D position of the pupil, may be determined. Based on the 3D position of the pupil, a 3D display effect (e.g., a 3D icon on the interface, a 3D video display effect, etc.) of an interface of the portable device may be determined. Based on a change in the position of the pupil, the 3D display effect of the interface may be adjusted.

Hereinafter, an example of image processing will be described in conjunction with the image processing method described herein.

Figure 11:
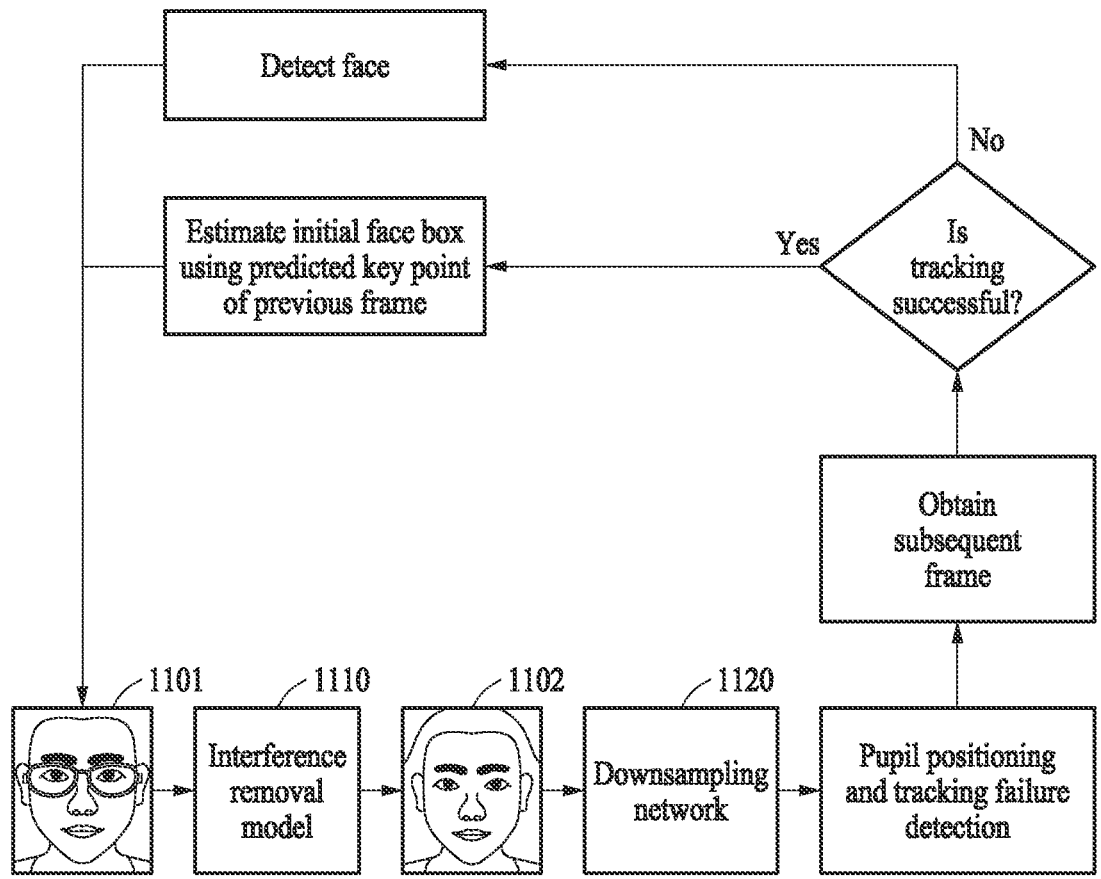
FIG. 11 illustrates an example of tracking in successive image frames.

In an example, as described herein, an image may be a facial image, a key point may include a key point of a pupil, and an eye interference may be eyeglasses. The image processing method may include the following steps as illustrated in FIG. 11:
1) Obtaining a second image 1101, which is an image including an eye interference, for example, eyeglasses;
2) Obtaining a first image 1102 (having a resolution of H*W) in which the interference is removed by inputting the second image 1101 to an interference removal model 1110;
3) Obtaining an image (having a resolution of h*w) by inputting the first image 1102 to a downsampling network 1120;
4) Estimating a key point position by inputting the image to a pupil positioning model, determining a reliability of a feature map of the image by inputting the feature map of the image to a tracking failure detection model, and determining whether tracking is successful based on the reliability;
5) When key point detection is successful, estimating an initial face box of a subsequent frame based on a key point, obtaining an original image of the subsequent frame, and repeating a process for key point detection with the subsequent frame image; and
6) When key point detection is unsuccessful, estimating an initial face box by performing face detection again, instead of estimating the initial face box using the key point of the image, when processing a subsequent frame, and obtaining an original image of the subsequent frame and repeating the process for key point detection on the subsequent frame image.

Using the image processing method described herein, one or more embodiments may improve the accuracy in detecting a key point position by determining a spatial position weight of pixel points in a feature map of an image, correcting the feature map based on the spatial position weight of pixel points and obtaining a corrected feature map, and detecting a key point position in the corrected feature map.

In addition, when processing the first image 1102, image feature information of the first image 1102 and first relative distance information of a projected point may be combined as an input. In this case, the influence of a position of the projected point may be better reflected in the input, and thus the image obtained through this may have a target resolution and an image feature of the first image 1102 may also be maintained.

In addition, by adopting an edge matching method, positions of eyes and pupils may be well maintained without changes, and key point positions of the pupils may be calculated more accurately.

In addition, when determining a reliability of the corrected feature map of the image, the reliability that is less than or equal to a preset threshold value may be considered a tracking failure (or a failure in key point detection) and the reliability that is greater than the preset threshold value may be considered a tracking success (or a success in key point detection). Through this, one or more embodiments may improve the accuracy of key point detection. In addition, when key point detection is successful, a face region of the image may be used as a reference face region of a subsequent frame image to be detected, and thus one or more embodiments may improve the time to be used for processing the subsequent frame image and improve calculation efficiency.

Figure 12:
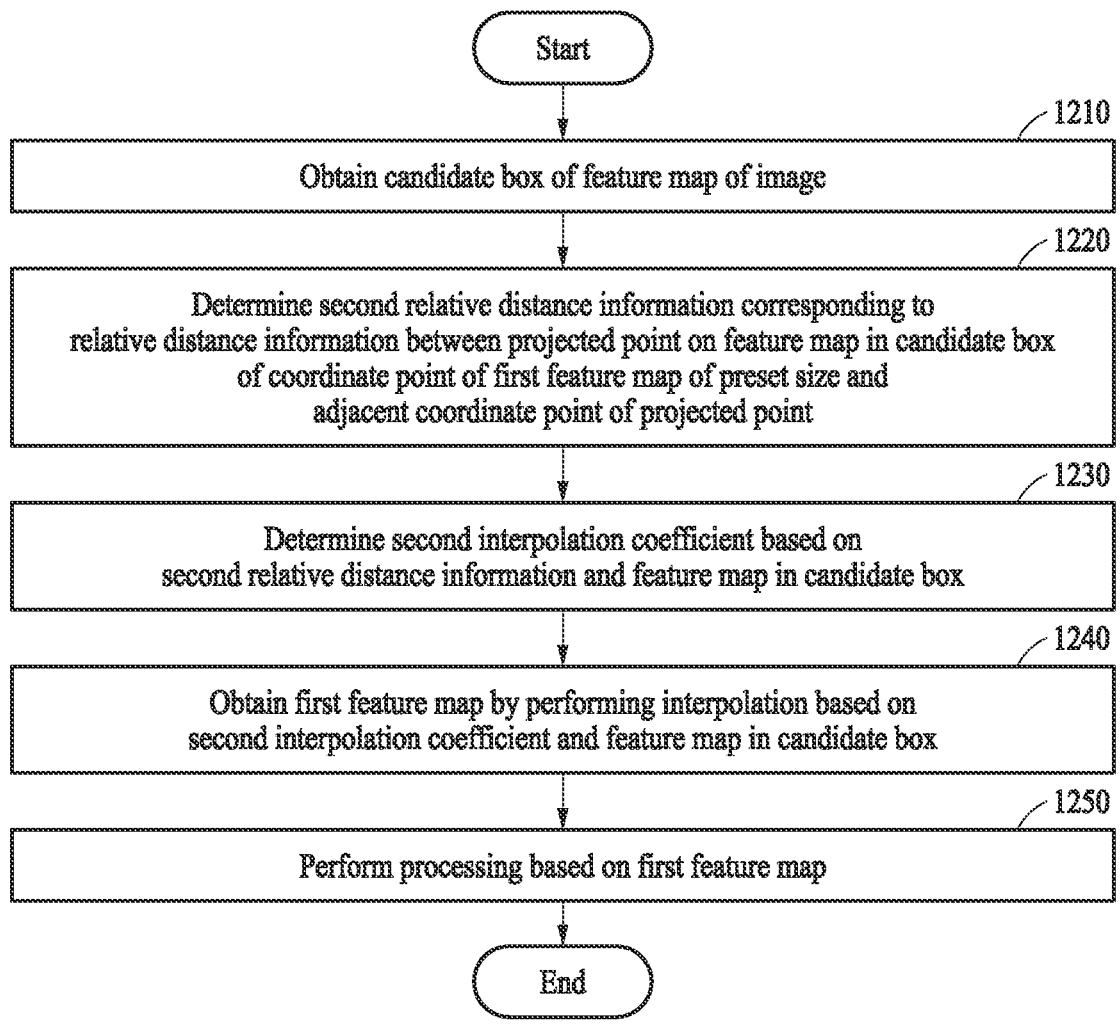
FIG. 12 illustrates an example of an image processing method.

In an example, the image processing method may include the following operations as illustrated in FIG. 12.

In operation 1210, a candidate box of a feature map of an image may be obtained.

The candidate box may be obtained by inputting the image to a target detection network, for example, a region proposal network (RPN).

In operation 1220, second relative distance information corresponding to information associated with a relative distance between a projected point on the feature map in the candidate box of a coordinate point of a first feature map of a preset size and an adjacent coordinate point of the projected point may be determined.

In operation 1230, a second interpolation coefficient may be determined based on the second relative distance information and the feature map in the candidate box.

In an example, operation 1230 may include the following steps:
(a) Obtaining a second spliced feature based on the feature map in the candidate box and the second relative distance information; and
(b) Obtaining the second interpolation coefficient by performing a convolution based on the second spliced feature.

In an example, operation 1230 may include the following steps:
(a) Obtaining a convolution feature map by performing a convolution based on the feature map in the candidate box; and (b) Determining the second interpolation coefficient based on the convolution feature map and the second relative distance information.

The second interpolation coefficient may be obtained by splicing the second relative distance information and the convolution feature map obtained when the convolution based on the feature map of the candidate box is performed.

In operation 1240, the first feature map may be obtained by performing an interpolation based on the second interpolation coefficient and the feature map in the candidate box. Through operation 1240, the size of the feature map in the candidate box may be scaled to be a preset size of the first feature map.

For example, as in a bilinear interpolation, a projected point may be obtained by projecting any one feature of the first feature map in a first candidate box onto the feature map in the candidate box. A feature on the first feature map in the first candidate box may be obtained by performing an interpolation based on a plurality of features adjacent to the projected point of the feature map in the candidate box. Through this, the first feature map in the first candidate box may be generated and the first candidate box may thereby be obtained.

In operation 1250, processing may be performed based on the first feature map.

The processing may selectively be other operations such as target detection, target classification, and target instance segmentation, but not limited thereto. When the candidate box of the feature map of the image is obtained, the candidate box may be used to determine a target category and a target position in the image.

In the foregoing example, the first feature map of the preset size may be obtained by scaling the size of the feature map in the candidate box to be the preset size through a downsampling network.

In the image processing method described herein, a second interpolation coefficient may be calculated based on the downsampling network by applying the downsampling network to target detection, the first feature map in the first candidate box may be obtained by scaling the feature map in the candidate box of the image to be detected, and target detection may be performed based on the scaled first feature map. Thus, one or more embodiments may improve the accuracy in target detection.

An example of the image processing method has been described above. Hereinafter, an example of the image processing method will be described in conjunction with an apparatus.

Figure 13:
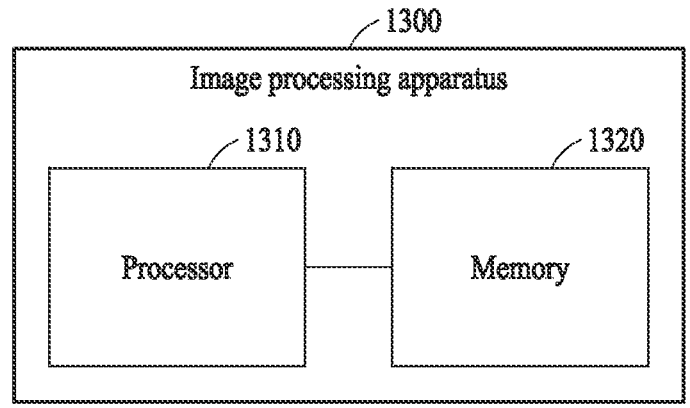
FIG. 13 illustrates an example of an image processing apparatus.

FIG. 13 illustrates an example of an image processing apparatus. Referring to FIG. 13, an image processing apparatus 1300 may include a processor 1310 (e.g. one or more processors) and a memory 1320 (e.g., one or more memories). The memory 1320 may be connected to the processor 1310, and may store instructions executable by the processor 1310, data to be computed by the processor 1310, or data processed by the processor 1310. The memory 1320 may include a non-transitory computer-readable medium, for example, a high-speed random access memory (RAM) and/or a nonvolatile computer-readable medium (e.g., at least one disk storage device, flash memory device, or another nonvolatile solid-state memory device). For example, the memory 1320 may store at least one of a pupil positioning model, a downsampling network, an interference removal model, a verification model, and a tracking failure detection model.

The processor 1110 may execute instructions to perform the operations described herein with reference to FIGS. 1 through 12, and 14. For example, the processor 1310 may obtain a feature map of an image, determine a spatial position weight of pixel points of the feature map, obtain a corrected feature map by correcting the feature map based on the spatial position weight of pixel points, and determine a key point based on the corrected feature map.

The processor 1310 may detect an initial position of key points of the image, obtain a first weight based on the initial position and obtain a second weight based on the feature map, and determine the spatial position weight based on the first weight and the second weight.

Before obtaining the feature map of the image, the processor 1310 may determine a first interpolation coefficient based on first relative distance information and a first image, and perform an interpolation based on the first interpolation coefficient and pixel points of the first image to obtain the image. The first relative distance information may be information associated with a relative distance between a projected point on the first image of a pixel point of the image and an adjacent pixel point of the projected point.

The processor 1310 may obtain the first interpolation coefficient by extracting a feature of the first image, obtaining a first spliced feature by splicing the feature and the first relative distance information, and performing a convolution based on the first spliced feature. Before determining the first interpolation coefficient based on the first relative distance information and the first image, the processor 1310 may obtain an eye region-free image that does not include an eye region by cropping an eye region image block including an interference from a second image, determine a pupil weight map based on the second image, obtain an interference-removed eye region image block in which the interference is removed based on the pupil weight map and the eye region image block, and obtain the first image or the image by splicing the interference-removed eye region image block and the eye region-free image.

The processor 1310 may determine a reliability of the feature map, and determine whether tracking succeeds based on the reliability. The processor 1310 may obtain the reliability of the feature map by performing a convolution operation, a fully connected operation, and a softmax operation based on the feature map.

The processor 1310 may adjust a 3D display effect of a display interface based on a position of the key point.

As described above, the image processing apparatus 1300 may determine a spatial position weight of pixel points of a feature map of an image, and correct the feature map based on the spatial position weight of pixel points and obtain the corrected feature map. The image processing apparatus 1300 of one or more embodiments may obtain a key point position by detecting the corrected feature map, thereby improving the accuracy in detecting a key point position.

In addition, when processing a first image, the image processing apparatus 1300 may combine, as an input, image feature information of the first image and first relative distance information of a projected point, to better apply the influence of a position of the projected point to the input. Thus, an image obtained through this may have a target resolution, and an image feature of the first image may also be maintained.

In addition, by adopting an edge matching method, positions of eyes and pupils may be well maintained without changes, and key point positions of the pupils may be calculated more accurately.

Further, when determining a reliability of the corrected feature map of the image, the reliability that is less than or equal to a preset threshold value may be considered a tracking failure, that is, a failure in key point detection. In contrast, the reliability that is greater than the preset threshold value may be considered a tracking success, that is, a success in key point detection. Accordingly, one or more embodiments may improve the accuracy in key point detection. In addition, by using a face region of the image obtained when key point detection is successful as a reference face region of a subsequent frame image of a video to be detected, one or more embodiments may improve the efficiency of processing the subsequent frame image.

Figure 14:
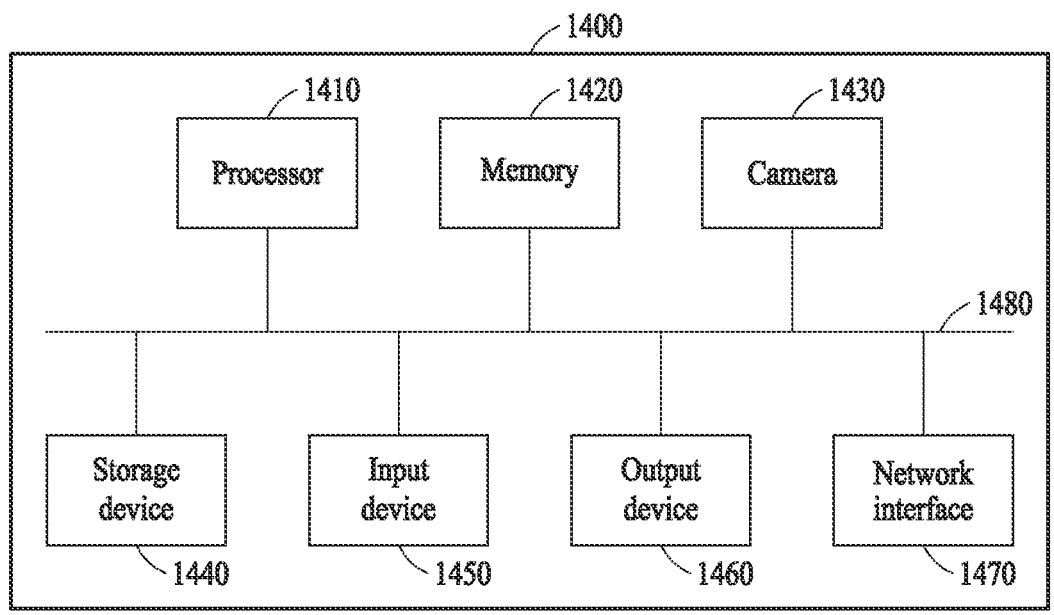
FIG. 14 illustrates an example of an electronic apparatus.

FIG. 14 illustrates an example of an electronic apparatus. Referring to FIG. 14, an electronic apparatus 1400 may include a processor 1410 (e.g., one or more processors), a memory 1420 (e.g., one or more memories), a camera 1430, a storage device 1440, an input device 1450, an output device 1460, and a network interface 1470. These components may communicate with one another through a communication bus 1480. For example, the electronic apparatus 1400 may be embodied as at least a portion of a mobile device (e.g., a mobile phone, a smartphone, a personal digital assistant (PDA), a netbook, a tablet computer, a laptop computer, etc.), a wearable device (e.g., a smartwatch, a smart band, smart eyeglasses, etc.), a computing device (e.g., a desktop, a server, etc.), a home appliance (e.g., a television (TV), a smart TV, a refrigerator, etc.), a security device (e.g., a door lock, etc.), or a vehicle (e.g., an autonomous vehicle, a smart vehicle, etc.). The electronic apparatus 1400 may structurally and/or functionally include an image processing apparatus 1300 of FIG. 13.

The processor 1410 may execute instructions and/or functions to be executed in the electronic apparatus 1400. For example, the processor 1410 may process instructions stored in the memory 1420 or the storage device 1440. The processor 1410 may perform one or more, or all, of operations described above with reference to FIGS. 1 through 13. The memory 1420 may include a computer-readable storage medium or a computer-readable storage device. The memory 1420 may store instructions to be executed by the processor 1410, and may store related information while software and/or an application is being executed by the electronic apparatus 1400. For example, the memory 1420 may store at least one of a pupil positioning model, a downsampling network, an interference removal model, a verification model, and a tracking failure detection model.

The camera 1430 may capture an image and/or a video. The storage device 1440 may include a computer-readable storage medium or a computer-readable storage device. The storage device 1440 may store a greater amount of information than the memory 1420 and store the information for a long period of time. The storage device 1440 may include, for example, a magnetic hard disk, an optical disc, a flash memory, a floppy disk, or any other type of nonvolatile memory that is well-known in the art.

The input device 1450 may receive an input from a user through a traditional input method using a keyboard and a mouse, and a new input method using, for example, a touch input, a voice input, and an image input. The input device 1450 may include, for example, a keyboard, a mouse, a touchscreen, a microphone, or any other device that detects an input from a user and transmits the detected input to the electronic apparatus 1400. The output device 1460 may provide an output of the electronic apparatus 1400 to a user through a visual, auditory, or tactile channel. The output device 1460 may include, for example, a display, a touchscreen, a speaker, a vibration generating device, or any other device that provides an output to a user. The network interface 1470 may communicate with an external device through a wired or wireless network.

An apparatus (e.g., the image processing apparatus 1300 and the electronic apparatus 1400) provided in example embodiments of the present disclosure may implement at least one of multi-modules through an artificial intelligence (AI) model. AI-related functions may be performed in a nonvolatile memory, a volatile memory, and a processor.

The processor may include one or more processors. In this case, the processors may be general-purpose processors such as a central processing unit (CPU), an application processor (AP), or the like, or AI-dedicated processors such as a graphics processing unit (GPU), a video processing unit (VPU), and/or a neural processing unit (NPU).

The processors may control processing of input data according to predefined operating rules or AI models stored in a nonvolatile memory and a volatile memory. The predefined operating rules or AI models may be provided through training or learning.

The provision through learning may be construed as obtaining the predefined operating rules or the AI models having desired characteristics by applying a learning algorithm to multiple learning data. The learning may be performed in a device itself in which AI is performed according to example embodiments, and/or may be implemented through a separate server or system.

An AI model may include a plurality of neural network layers. Each layer may have a plurality of weight values, and calculation of one layer may be performed based on a calculation result from a previous layer and a plurality of weights of a current layer. A neural network may include, for example, a convolutional neural network (CNN), a deep neural network (DNN), a recurrent neural network (RNN), a restricted Boltzmann machine (RBM), a deep belief network (DBN), a bidirectional recurrent deep neural networks (BRDNN), a generative adversarial network (GAN), and a deep Q network, but examples of which are not limited thereto.

The learning algorithm may be a method of training a predetermined target device (e.g., a robot) using multiple learning data to make, allow, or control the determination or prediction of the target device. The learning algorithm may include, but are not limited to, supervised learning, unsupervised learning, semi-supervised learning, or reinforcement learning.

The image processing apparatuses, electronic apparatuses, processors, memories, cameras, storage devices, input devices, output devices, network interfaces, communication buses, image processing apparatus 1300, processor 1310, memory 1320, electronic apparatus 1400, processor 1410, memory 1420, camera 1430, storage device 1440, input device 1450, output device 1460, network interface 1470, communication bus 1480, and other apparatuses, devices, units, modules, and components described herein with respect to FIGS. 1-14 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-14 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computer.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

What is claimed is:
1. A method with image processing, comprising:
determining a feature map of an image;
determining a spatial position weight of pixel points of the feature map, based on a first weight determined based on an initial position of key points of the image and a second weight determined based on the feature map;

determining a corrected feature map by correcting values of the pixel points of the feature map based on the spatial position weight of the pixel points; and
determining a key point based on the corrected feature map.

2. The method of claim 1, wherein the determining of the spatial position weight comprises:
detecting the initial position of the key points of the image;
determining the first weight based on the initial position;
determining the second weight based on the feature map; and
determining the spatial position weight based on the first weight and the second weight.

3. The method of claim 1, further comprising:
determining a first interpolation coefficient based on first relative distance information and a first image; and
determining the image by performing an interpolation based on the first interpolation coefficient and pixel points of the first image,
wherein the first relative distance information is information associated with a relative distance between a projected point on the first image of a pixel point of the image and an adjacent pixel point of the projected point.

4. The method of claim 3, wherein the determining of the first interpolation coefficient comprises:
extracting a feature of the first image;
determining a first spliced feature by splicing the feature and the first relative distance information; and
determining the first interpolation coefficient by performing a convolution based on the first spliced feature.

5. The method of claim 4, further comprising:
determining an eye region-free image that does not comprise an eye region by cropping, from a second image, an eye region image block comprising an interference;
determining a pupil weight map based on the second image;
determining an interference-removed eye region image block in which the interference is removed based on the pupil weight map and the eye region image block; and
determining an image by splicing the interference-removed eye region image block and the eye region free-image.

6. The method of claim 1, further comprising:
determining a reliability of the feature map; and
determining whether tracking is successful based on the reliability.

7. The image processing method of claim 6, wherein the determining of the reliability comprises:
determining the reliability of the feature map by performing a convolution operation, a fully connected operation, and a softmax operation based on the feature map.

8. The method of claim 1, further comprising:
adjusting a three-dimensional (3D) display effect of a display interface based on a position of the key point.

9. A non-transitory computer-readable storage medium storing instructions that, when executed by a processor, configure the processor to perform the method of claim 1.

10. A method with image processing, comprising:
determining a candidate box of a feature map of an image;
determining second relative distance information corresponding to information associated with a relative distance between a projected point on the feature map in the candidate box of a coordinate point of a first feature map of a preset size and an adjacent coordinate point of the projected point, wherein the candidate box is bound by adjacent coordinate points including the adjacent coordinate point having the same distance therebetween;
determining a second interpolation coefficient based on the second relative distance information and the feature map in the candidate box;
determining the first feature map by performing an interpolation based on the second interpolation coefficient and the feature map in the candidate box; and
performing processing based on the first feature map.

11. The method of claim 10, wherein the determining of the second interpolation coefficient comprises:
determining a second spliced feature based on the feature map in the candidate box and the second relative distance information; and
determining the second interpolation coefficient by performing a convolution based on the second spliced feature.

12. An apparatus with image processing, comprising:
a processor configured to:
determine a feature map of an image;
determine a spatial position weight of pixel points of the feature map, based on a first weight determined based on an initial position of key points of the image and a second weight determined based on the feature map;
determine a corrected feature map by correcting values of the pixel points of the feature map based on the spatial position weight of the pixel points; and
determine a key point based on the corrected feature map.

13. The apparatus of claim 12, wherein, for the determining of the spatial position weight, the processor is configured to:
detect the initial position of the key points of the image;
determine the first weight based on the initial position;
determine the second weight based on the feature map; and
determine the spatial position weight based on the first weight and the second weight.

14. The apparatus of claim 12, wherein the processor is configured to:
determine a first interpolation coefficient based on first relative distance information and a first image; and
determine the image by performing an interpolation based on the first interpolation coefficient and pixel points of the first image,
wherein the first relative distance information is information associated with a relative distance between a projected point on the first image of a pixel point of the image and an adjacent pixel point of the projected point.

15. The apparatus of claim 14, wherein, for the determining of the first interpolation coefficient, the processor is configured to:
extract a feature of the first image;
determine a first spliced feature by splicing the feature and the first relative distance information; and
determining the first interpolation coefficient by performing a convolution based on the first spliced feature.

16. The apparatus of claim 15, wherein the processor is configured to:
determine an eye region-free image that does not comprise an eye region by cropping, from a second image, an eye region image block comprising an interference;
determine a pupil weight map based on the second image;

determine an interference-removed eye region image block in which the interference is removed based on the pupil weight map and the eye region image block; and determine an image by splicing the interference-removed eye region image block and the eye region free-image.

17. The apparatus of claim 12, wherein the processor is configured to:

determine a reliability of the feature map; and determine whether tracking is successful based on the reliability.

18. The apparatus of claim 17, wherein the processor is configured to:

determine the reliability of the feature map by performing a convolution operation, a fully connected operation, and a softmax operation based on the feature map.

19. The apparatus of claim 12, wherein the processor is configured to:

adjust a three-dimensional (3D) display effect of a display interface based on a position of the key point.

20. The apparatus of claim 19, further comprising the display interface configured to display the adjusted 3D display effect.

21. The apparatus of claim 12, further comprising a memory storing instructions that, when executed by the processor, configure the processor to perform the determining of the feature map, the determining of the spatial position weight, the determining of the corrected feature map, and the determining of the key point.

22. A method with image processing, comprising:

determining a first weight based on an initial position of key points of an image;

determining a second weight based on a feature map of the image;

determining a spatial position weight of pixel points of the feature map based on the first weight and the second weight; and determining a key point by correcting values of the pixel points of the feature map based on the spatial position weight.

\* \* \* \* \*